UNITED STATES PATENT OFFICE.

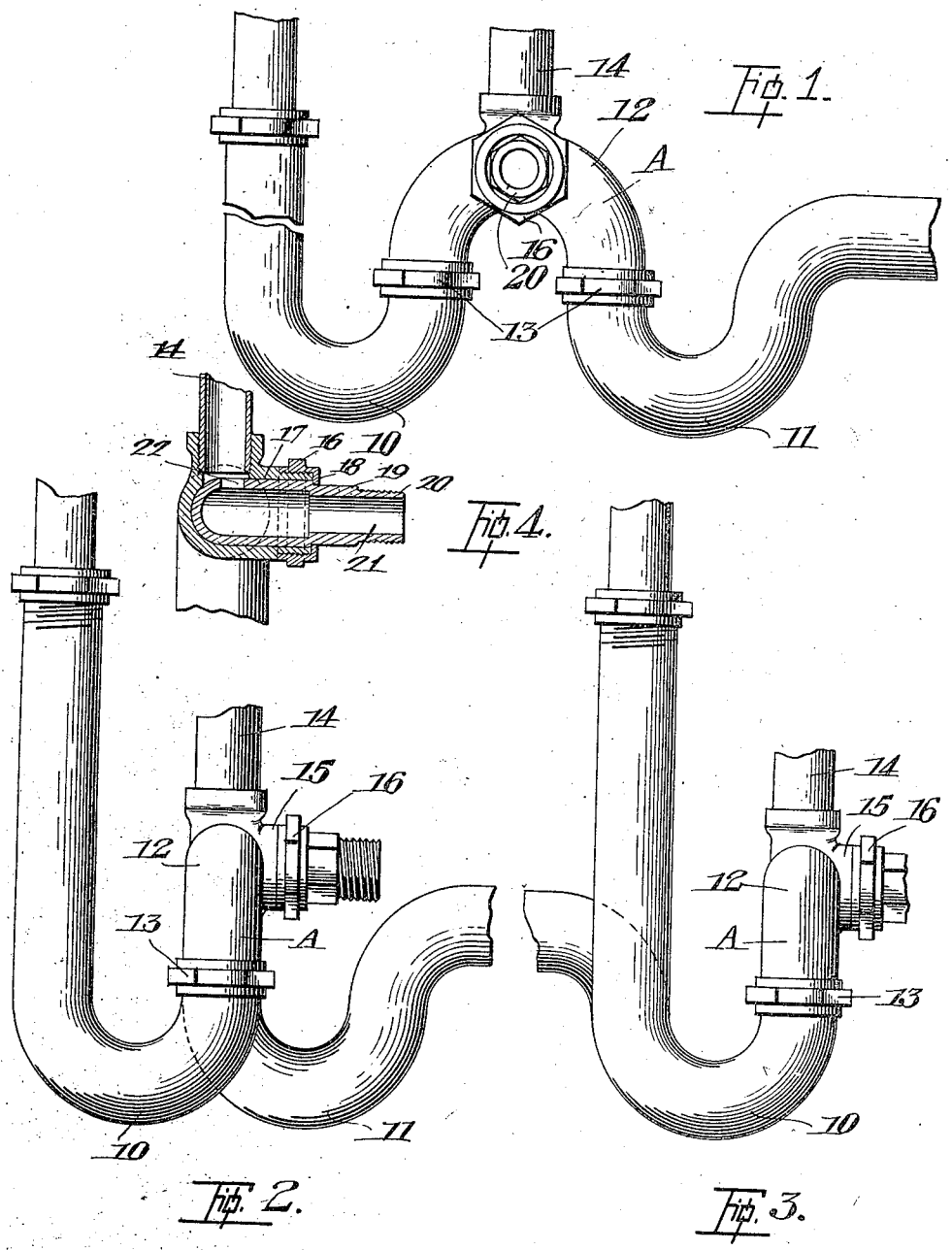

ROBERT NICHOLAS MURPHY, OF OTTAWA, ONTARIO, CANADA.

SANITARY TRAP.

1,311,287.   Specification of Letters Patent.   Patented July 29, 1919.

Application filed March 18, 1918.   Serial No. 223,161.

*To all whom it may concern:*

Be it known that I, ROBERT NICHOLAS MURPHY, a subject of the King of Great Britain, and resident of the city of Ottawa, in the Province of Ontario, Dominion of Canada, have invented certain new and useful Improvements in Sanitary Traps, of which the following is a specification.

This invention relates to improvements in sanitary traps and one of the objects of the invention is to provide a pair of water seals which are adjustable to each other so that the trap can be readily attached to any fixture at present in use and can be located in an extremely limited space in which other traps, other than those originally used with the fixture, could not be used.

Further objects are to permit of the seals or vents, etc., associated with and forming part of the trap being readily flushed from a water main so that any blockage in the trap can be readily removed, and generally to adapt the trap to better perform the functions required of it.

With the above and other objects in view, the invention consists essentially of the improved construction particularly described and set forth in the following specification and accompanying drawings forming part of the same.

In the drawings:

Figure 1 is a side elevation of the trap with the water seals in alinement.

Fig. 2 is a side elevation of the improved trap arranged with the water seals in parallel planes.

Fig. 3 is a side elevation of a further adjustment of the trap with the water seals arranged in parallel planes.

Fig. 4 is a fragmentary sectional elevation of the flushing cock of the trap.

Like characters of reference refer to like parts in the several figures.

Referring to the drawings, A represents the improved trap comprising a pair of water seals 10 and 11 operatively connected to the curvilinear pipe 12 by means of the nuts 13, the pipe being designed to form an air chamber between the seals, and the seals may be arranged at any angle relatively to the said air chamber and to each other.

The curvilinear pipe 12 is provided with an upwardly extending ventilating pipe 14, while on one side a laterally extending boss 15 is formed with which the nut 16 makes threaded engagement.

A flushing cock 17 is rotatably mounted in the boss 15 and the inner end of the cock is formed hemispherical and adapted to bear or seat against the inner wall of the pipe 12. The outer periphery of the flushing cock 17 is stepped and forms a shoulder 18 against which the nut 16 engages to prevent longitudinal displacement of the flushing cock and adjacent to this shoulder the cock is formed with a hexagonal outer wall 19 designed to be engaged with a spanner to permit of the said cock being manually rotated.

The outer end 20 of the cock is threaded so that it may be readily connected to a hose or like flexible pipe which in turn is connected to a water main or faucet.

The flushing cock 17 is formed with a hollow bore 21 terminating adjacent to the hemispherical end of the cock and this bore communicates with an outlet orifice 22 extending through the wall of the cock.

As the cock 17 is rotated, the orifice 22 will register with the bore of either of the water seals 10 and 11 or with the ventilating pipe 14 so that each of these parts of the trap may be flushed in turn.

When the trap is normally in use, the flushing cock 17 will not be positioned as shown in the drawings, but will be removed and a blind flange will be inserted between the outer face of the boss 15 and the nut 16.

When the invention is in use, the seals 10 or 11 may be arranged in alinement as shown in Fig. 1 and this method might be adapted where a sufficient clearance is obtained between the wall of the room where the fixture is stationed and the said fixture. In this manner the nut 16 is readily accessible to permit of the flushing cock 17 being inserted into the boss 15 if it is found desirable to flush the trap.

Normally the curvilinear pipe 12 would form an air chamber between the seal 10 or 11 but should the ventilating pipe 14 become blocked, an air lock would form in the chamber 12 and this air lock could not be broken unless there was a sufficient head of water in the fixture to which the trap was attached to force the water out of the seal 10 through the air and into the seal 11.

It will thus be seen that when such a state of affairs happens, the water will not leave the fixture and clearly indicates that the vent requires flushing. The nut 16 will therefore be removed and the blind washer displaced to permit of the flushing cock 17 being inserted into the boss 15, whereupon the nut 16 will be replaced and the flushing cock connected to a water main.

The flushing cock is now rotated into that position shown in Fig. 4, in which the orifice 22 registers with the ventilating pipe 14, and when the pressure of the water from the main is exerted on the blockage in the said ventilating pipe, the said blockage will be forcibly removed or blown out.

Should any blockage occur in either of the seals 10 or 11, the flushing cock 17 may be rotated until the discharge orifice 22 registers with the bore of the said seals, and the water from the water main can then be turned into the said seals to thoroughly flush and clean the same out. The flushing of the trap will thus occupy at the most, only a few minutes.

If it is found that the clearance between the fixture and the wall of the room in which it is placed is not very great, then the seals 10 and 11 can be arranged in parallel planes, and the curvilinear pipe 12 arranged transversely to the seals, but connected thereto by means of the nut 13, and in this position the trap will only occupy about two-thirds of the space occupied in that position shown in Fig. 1.

If the space between the wall and the fixture is even more limited, the water seals 10 and 11 can be arranged in parallel planes as shown in Fig. 3 when the curvilinear pipe 12 is transversely arranged relatively to the seals and in this position the trap will only occupy one-half of the space shown in Fig. 1.

There are an indefinite number of angles and positions in which the seals 10 and 11 can be arranged relatively to each other, and the curvilinear pipe 12 can be interchanged to bring the boss 15 into the desired position to give a ready access thereto for the insertion of the flushing cock 17.

From the above description, it will be seen that I have invented an adjustable trap capable of being used on all fixtures at present in use, and in which the water seals can be adjusted relatively to each other, and to a connecting air chamber located therebetween, so that when the trap is arranged in position it will be compact in construction and occupy a minimum of space, yet permitting at all times that the several parts will be capable of ready inspection or being flushed should a blockage occur.

It should also be particularly borne in mind that the flushing cock 17, while adapted for flushing out blockage in the trap may also be used for applying an ordinary gas or smoke test when such is found necessary by sanitary engineers or in compliance with any municipal regulations.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A trap of the class described comprising a pair of water seals, an air chamber intermediate of the water seals, and adjusted relatively thereto, a ventilating pipe connected to the air chamber, and means engaging with the air chamber adapted to flush the water seals and ventilating pipe individually and successively.

2. A trap of the class described comprising a pair of water seals, a curvilinear pipe intermediate of the water seals, and connecting the seals and adjusted relatively thereto, a boss formed on the curvilinear pipe and a flushing cock engaging with the boss, and designed to permit of the seals being flushed individually and successively.

3. A trap of the class described, comprising a pair of water seals, an air chamber intermediate of the water seals and adjusted relatively thereto, an air vent on the air chamber, a boss on the air chamber, a flushing cock rotatably engaging with the boss and provided with a stepped outer periphery forming a shoulder, and a nut making threaded engagement with the boss and engaging with the said shoulder.

In witness whereof I have hereunto set my hand.

ROBERT NICHOLAS MURPHY.

Copies of this patent may be obtained for five cents each, by addressing the "Commissioner of Patents, Washington, D. C."